Patented Feb. 27, 1945

2,370,540

UNITED STATES PATENT OFFICE 2,370,540

CHLOROMETHYL ETHERS OF NITRO ALCOHOLS

Edward B. Hodge, Terre Haute, Ind., assignor to Commercial Solvents Corporation, Terre Haute, Ind., a corporation of Maryland No Drawing. Application September 7, 1942, Serial No. 457,632

9 Claims. (Cl. 260—614)

My invention relates to new and useful chloromethyl ethers. More particularly, it is concerned with 2-nitro-1-chloromethoxyalkanes having the following general structural formula:

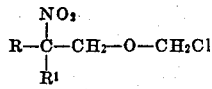

in which R is an alkyl group and $R^1$ may be either hydrogen or alkyl. Specific examples included by the above generic formula are 2-nitro-1-chloromethoxy-2-methylpropane, 2-nitro-1-(chloromethoxy)-butane, 2-nitro-1-chloromethoxy-2-methylbutane, 2-nitro-1-chloromethoxy-2-methylpentane, 2-nitro-1-(chloromethoxy)-pentane, and the like.

In accordance with my invention, 2-nitro-1-chloromethoxyalkanes are prepared by introducing hydrogen chloride into a mixture consisting essentially of a primary monohydric aliphatic nitro alcohol and formaldehyde, the latter being preferably in the form of an aqueous solution. Since the reaction involved is exothermic in character, it is desirable to cool the reaction vessel by external means, and for optimum yields, the temperature of the medium should be maintained between about 0° and 20° C. When absorption of hydrogen chloride appears to be complete, the crude reaction mixture is extracted with a suitable solvent, such as benzene, after which the resulting water insoluble layer is separated, dried, and then subjected to aeration in order to remove certain volatile impurities therefrom, which are generally found to be present. After this treatment, the solvent is removed by distillation, and the crude 2-nitro-1-chloromethoxyalkane purified by fractional distillation, preferably under reduced pressure.

As mentioned previously, the 2-nitro-1-chloromethoxyalkanes of my invention may be prepared from any primary monohydric aliphatic nitro alcohol, such as, for example 2-nitro-1-propanol, 2-nitro-2-methyl-1-propanol, 2-nitro-1-butanol, 2-nitro-2-methyl-1-butanol, 2-nitro-1-pentanol, 2-nitro-2-methyl-1-pentanol, and the like. Although the 2-nitro-1-chloromethoxyalkanes of my invention may be prepared from nitro alcohols of the type listed above, I have found, contrary to the results expected, that certain nitro alcohols, which are homologs or isomers of the above-mentioned class, will not react to form the corresponding chloromethyl ethers under the operation conditions herein set forth. This fact has been substantiated by certain experiments in which I have found such nitro alcohols as 2-nitro-2-methyl-1,3-propanediol, 2-nitro-2-methyl-3-hexanol, and 2-nitro-2-methyl-1-phenyl-1-propanol to be incapable of reacting with formaldehyde in the presence of hydrogen chloride to form the corresponding chloromethyl ethers under the above-described conditions. An additional and surprising feature of my invention is the fact that on the basis of prior knowledge, relative to the high degree of instability of the ordinary chloromethyl ethers of the unsubstituted aliphatic alcohols as a class, it would be unpredictable that the 2-nitro-1-chloromethoxyalkanes of my invention are physically capable of existing inasmuch as the nitro group would normally be expected to increase the instability of such compounds.

The following examples describe certain of the new 2-nitro-1-chloromethoxyalkanes and their method of preparation; however, such examples are not to be construed as limiting my invention since I have found that the reaction between formaldehyde and nitro alcohols of the class described, in the presence of hydrogen chloride, is very general and may be readily effected.

Example I

A mixture consisting of 119 parts of 2-nitro-2-methyl-1-propanol and 54 parts of formaldehyde in the form of a 36 per cent solution, was placed in a reaction vessel equipped with a suitable jet located at the bottom thereof, for the introduction of hydrogen chloride. Throughout the course of the reaction, the reaction medium was maintained at a temperature of approximately 18° C., by circulating water about the outer walls of the reaction vessel. When the reaction appeared to be complete, as evidenced by the failure of the mixture to absorb additional hydrogen chloride, the introduction of the latter was discontinued and approximately 50 parts of benzene was added in order to extract the crude 2-nitro-1-chloromethoxy-2-methylpropane. The benzene extract thus obtained was separated from the lower aqueous layer and dried with calcium chloride, after which dry air was blown through the benzene extract for approximately one-half hour. The dry extract was fractionally distilled under atmospheric pressure to remove the benzene therefrom, after which the residue was subjected to fractional distillation under vacuum, and the fraction boiling at 85° C. (4 mm.) collected. The 2-nitro-1-chloromethoxy-2-methylpropane thus obtained was a clear white material amounting to a total of 110.8 parts.

Analysis: Calc. for $C_5H_{10}NO_3Cl$: N, 8.37; C, 21.2. Found: N, 8.5; Cl, 20.3. $d_{20}^{20}$, 1.2055; $n_D^{20}$, 1.4498.

Example II 2-nitro-1-(chloromethoxy)-butane was prepared in accordance with the procedure outlined in Example I, using 120 parts of 2-nitro-1-butanol and 54 parts of formaldehyde in the form of a 36 per cent aqueous solution. In refining the crude product, the benzene was removed therefrom under reduced pressure, after which the resulting residue was fractionated at a pressure of 1 mm., and the portion boiling at 95° C., collected. The 2-nitro-1-(chloromethoxy)-butane, thus obtained, amounted to a total of 108 parts, and possessed a light yellow color.

Analysis: Calc. for $C_5H_{10}NO_3Cl$: N, 8.37. Found: N, 8.6. $d_{20}^{20}$, 1.2078; $n_D^{20}$, 1.4510.

Example III 2-nitro-1-chloromethoxy-2-methylbutane was prepared as described above, using 182 parts of 2-nitro-2-methyl-1-butanol and 54 parts of formaldehyde in the form of a 36 per cent aqueous solution. The crude 2-nitro-1-chloromethoxy-2-methylbutane was refined in the manner previously described. The purified product boiled at 98° C. (3 mm.), and amounted to 127 parts.

Analysis: Calc. for $C_6H_{12}NO_3Cl$: N, 7.72; Cl, 19.52. Found: N, 7.91; Cl, 19.31. $d_{20}^{20}$, 1.1752; $n_D^{20}$, 1.4548.

The 2-nitro-1-chloromethoxyalkanes of my invention are generally found to be high boiling liquids insoluble in water, but soluble in benzene and the common oxygenated organic solvents. These compounds are useful as intermediates in the preparation of numerous organic compounds having valuable properties. A specific use of the compounds of my invention is to be found in the preparation of mixed acetals. Other uses of these materials will be apparent to those skilled in the art.

Now having described my invention, what I claim is:

1. As new compositions of matter, 2-nitro-1-chloromethoxyalkanes of the formula:

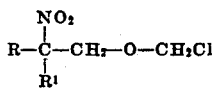

wherein R represents an alkyl group, and $R^1$ is selected from the group consisting of hydrogen and alkyl.

2. 2-nitro-1-chloromethoxy-2-methylpropane.
3. 2-nitro-1-(chloromethoxy)-butane.
4. 2-nitro-1-chloromethoxy-2-methylbutane.
5. In a process for the preparation of 2-nitro-1-chloromethoxyalkanes of the general formula:

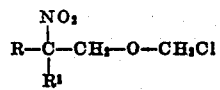

in which R represents an alkyl group, and $R^1$ is a member selected from the group consisting of hydrogen and alkyl, the step which comprises introducing hydrogen chloride into a mixture comprising essentially a primary monohydric aliphatic nitro alcohol and formaldehyde, the latter being present in a ratio of approximately 2 moles for each mole of nitro alcohol, said hydrogen chloride being introduced until said mixture is substantially saturated with respect thereto.

6. In a process for the preparation of 2-nitro-1-chloromethoxyalkanes of the formula:

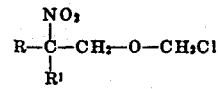

in which R represents an alkyl group, and $R^1$ is a member selected from the group consisting of hydrogen and alkyl, the step which comprises introducing hydrogen chloride into a mixture comprising essentially a primary monohydric aliphatic nitro alcohol and formaldehyde, the latter being present in a ratio of approximately 2 moles for each mole of nitro alcohol, at a temperature of between about 0° and 20° C., said hydrogen chloride being introduced until absorption thereof, by said mixture, is completed.

7. In a process for the preparation of 2-nitro-1-chloromethoxy-2-methylpropane, the step which comprises introducing hydrogen chloride into a mixture comprising essentially 2-nitro-2-methyl-1-propanol and formaldehyde, the latter being present in a ratio of approximately 2 moles for each mole of 2-nitro-2-methyl-1-propanol, said hydrogen chloride being introduced until said mixture is substantially saturated with respect thereto.

8. In a process for the preparation of 2-nitro-1-(chloromethoxy)-butane, the step which comprises introducing hydrogen chloride into a mixture comprising essentially 2-nitro-1-butanol and formaldehyde, the latter being present in a ratio of approximately 2 moles for each mole of 2-nitro-1-butanol, said hydrogen chloride being introduced until said mixture is substantially saturated with respect thereto.

9. In a process for the preparation of 2-nitro-1-chloromethoxy-2-methylbutane, the step which comprises introducing hydrogen chloride into a mixture comprising essentially 2-nitro-2-methyl-1-butanol and formaldehyde, the latter being present in a ratio of approximately 2 moles for each mole of 2-nitro-2-methyl-1-butanol, said hydrogen chloride being introduced until said mixture is substantially saturated with respect thereto.

EDWARD B. HODGE.